Figure 3:
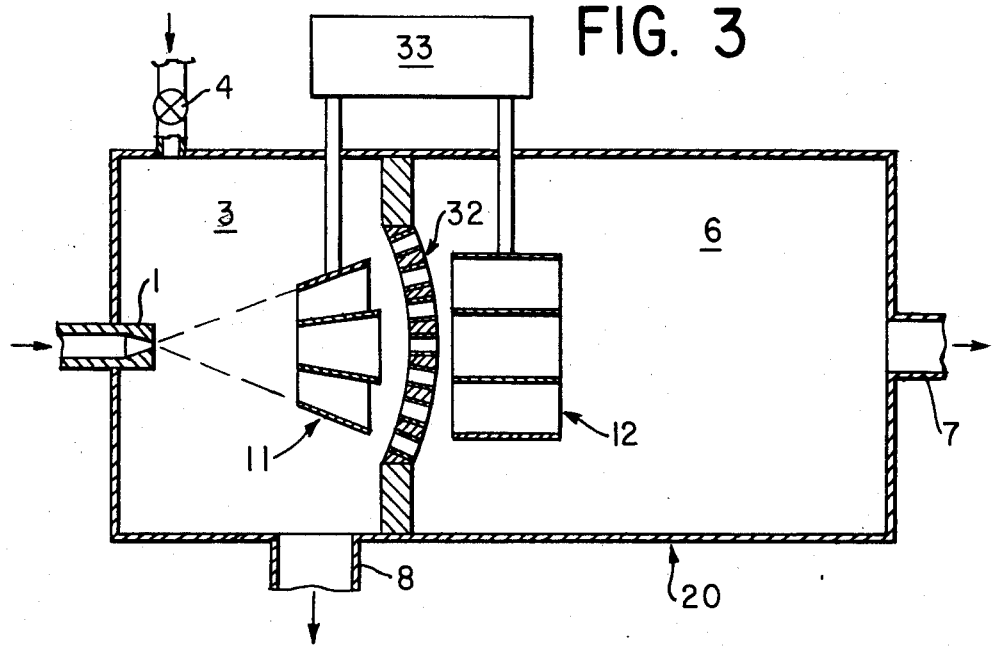
Figure 4:
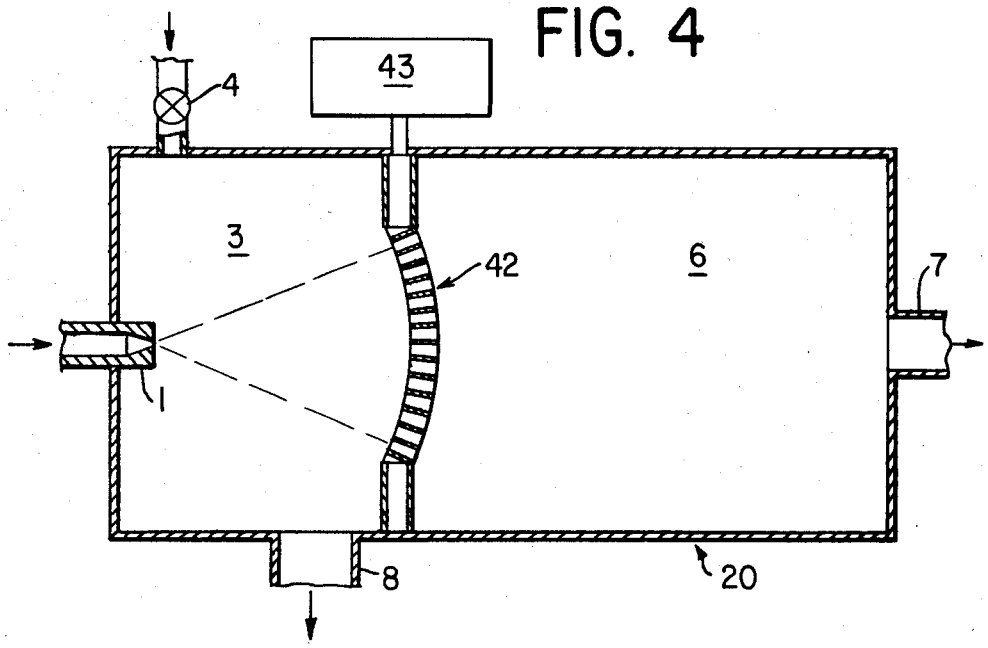
Figure 5:
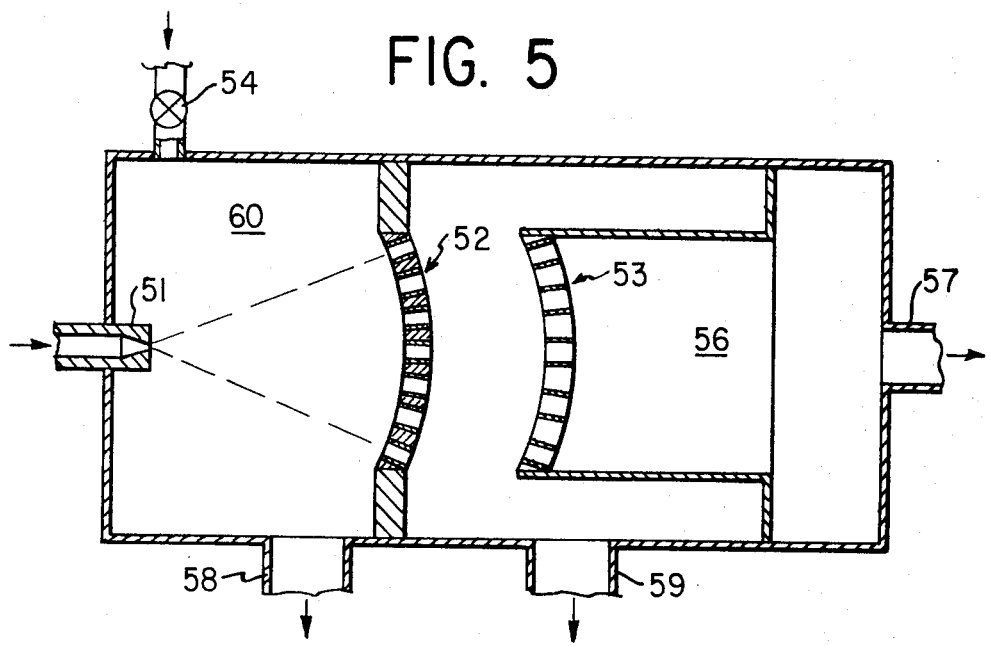

United States Patent [19]

Andres

[11] 4,284,418
[45] Aug. 18, 1981

[54] PARTICLE SEPARATION METHOD AND APPARATUS

[75] Inventor: Ronald P. Andres, Princeton, N.J.

[73] Assignee: Research Corporation, New York, N.Y.

[21] Appl. No.: 52,906

[22] Filed: Jun. 28, 1979

[51] Int. Cl.³ .................... B01D 53/22; B01D 59/12
[52] U.S. Cl. ............................................ 55/16; 55/17; 55/66; 55/158; 55/277
[58] Field of Search ................... 55/16, 17, 66, 158, 55/277, 461, DIG. 14

[56] References Cited

U.S. PATENT DOCUMENTS

| | | | |
|---|---|---|---|
| 485,915 | 11/1892 | Duckham | 55/277 |
| 2,422,882 | 6/1947 | Bramley | 55/17 X |
| 2,540,695 | 2/1951 | Smith et al. | 55/DIG. 14 |
| 2,607,439 | 8/1952 | Dickens et al. | 55/17 |
| 2,609,059 | 9/1952 | Benedict | 55/16 |
| 3,208,197 | 9/1965 | Simon et al. | 55/16 |
| 3,420,069 | 1/1969 | Booth | 55/16 X |
| 3,465,500 | 9/1969 | Fenn | 55/17 |
| 3,559,373 | 2/1971 | Garrett | 55/277 X |
| 3,616,596 | 11/1971 | Campargue | 55/17 |
| 3,648,473 | 3/1972 | Stephenson | 62/95 X |
| 3,853,528 | 12/1974 | Wodrich et al. | 55/17 X |
| 3,912,470 | 10/1975 | Fluckiger | 55/17 X |
| 3,989,483 | 11/1976 | Becker et al. | 55/17 |
| 4,084,943 | 4/1978 | Hamel et al. | 55/17 |
| 4,097,247 | 6/1978 | Anderson | 55/17 |

FOREIGN PATENT DOCUMENTS

| | | | |
|---|---|---|---|
| 195900 | 7/1957 | Austria | 55/431 |
| 1020960 | 12/1957 | Fed. Rep. of Germany | 55/17 |
| 2013990 | 10/1971 | Fed. Rep. of Germany | 55/66 |
| 2733738 | 2/1978 | Fed. Rep. of Germany | 55/277 |
| 1173992 | 3/1959 | France | 55/17 |

OTHER PUBLICATIONS

Science, vol. 187, "Reports", pp. 642–644, Feb. 1975, Anderson et al.
Gspann et al., Mass Dependent Molecular Beam Focusing by Cross-Jet Deflection, 7/1976, 10th Int. Symposium on Rarefied Gas Dynamics.
Campargue, Aerodynamic Separation Effect etc., Feb. 15, 1970, The Journal of Chemical Physics, vol. 52, No. 4, pp. 1795–1802.
Becker et al., The Separation Nozzle–etc., 7/1976, 10th Int. Symposium on Rarefied Gas Dynamics.
Thuan and Andres, Free Jet Deceleration—A Scheme for Separating Gas Species of Disparate Mass, Jul. 3–8, 1978, 11th Int. Symp.
Eaton et al., Isotope Enrichment by Aerodynamic Means: A Review and Some Theoretical Considerations, Jounral of Energy, vol. 1, No. 1, 7–8/1977.
Schwartz et al., Recent Development in Aerosol Science, Chapter 10, pp. 225–237, On–Line Particle Size Determination, etc.
Schwartz et al., J. Aerosol Sci., 1976, vol. 7, pp. 281–296, Theoretical Basis of the Time-of-Flight Aerosol Spectrometer, etc.
Nguyen Ke Thaun, Free Jet Deceleration: A Scheme for Separation of Gas Species of Disparate Mass, Doctoral Dissertation, 1/1979, 108 pp.

*Primary Examiner*—Robert H. Spitzer
*Attorney, Agent, or Firm*—Darby & Darby

[57] ABSTRACT

A method and apparatus for separating molecules or particles of different mass comprises combining the molecules or particles in a carrier gas of lighter molecular weight, accelerating the composite mixture in a supersonic free jet, decelerating the free jet through a light background gas at a controlled pressure, directing the decelerating jet onto a membrane wherein the constituents of the composite mixture are segregated, withdrawing a stream enriched in the high mass species which preferentially pass through the membrane, and withdrawing a stream enriched in the low mass species which are preferentially blocked by the membrane.

35 Claims, 5 Drawing Figures

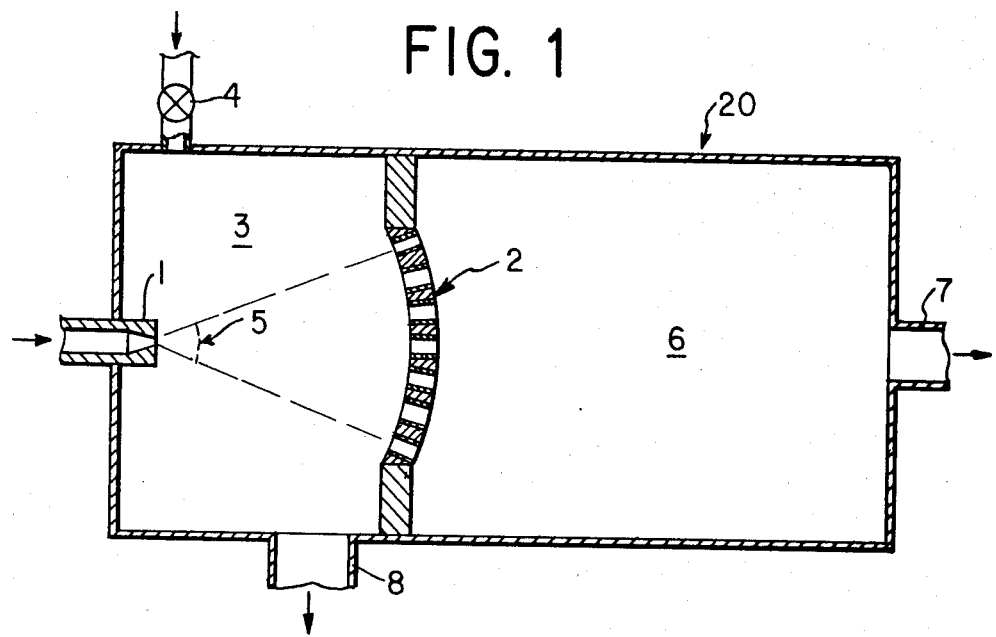
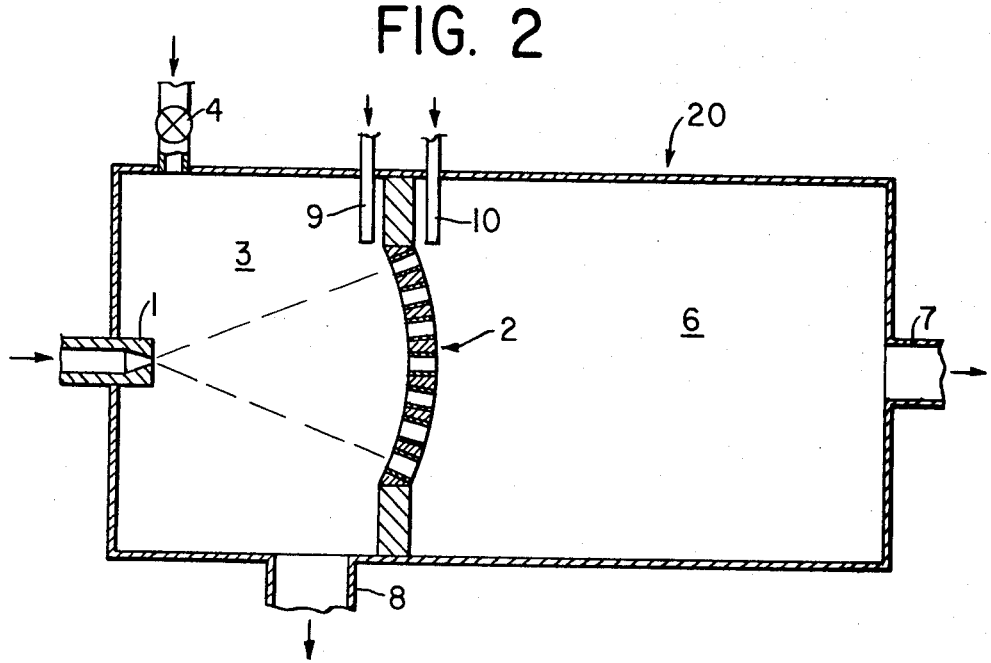

PARTICLE SEPARATION METHOD AND APPARATUS

BACKGROUND OF THE INVENTION

This invention relates to separating particles of different mass in a gas mixture. It has principal utility in the separation and size analysis of submicron particles in aerosols and in the isolation and enrichment of gaseous isotopes. It is to be understood that the term "particle" as used herein encompasses the entire size range from solid or liquid aggregates of about a micron in diameter to molecules of a few Angstroms in diameter.

Conventional methods of gas separation through gaseous diffusion, absorption, liquefaction, and fractional distillation are well known. Recent developments in gas separation technology, particularly as applied to isotope separation for uranium enrichment, have produced various forms of gas centrifuges and gasdynamic separation devices. As summarized in the article entitled "Isotope Enrichment by Aerodynamic Means: A Review and Some Theoretical Considerations" by R. Eaton, R. Fox, and K. Touryan, published in Journal of Energy, Vol. 1, No. 4, July-August 1977, pages 229 to 236, gasdynamic separation devices are generally characterized either as Type I, wherein the separation of species of different mass is induced by pressure gradient, or Type II, wherein separation is achieved through molecular perturbations from an equilibrium distribution. For separation of gaseous isotopes, conventional methods and present gasdynamic separation schemes are generally characterized by the problems of low separation yields, high capital costs, high power consumption per unit of separation work, technical complexity, and/or lack of compatibility with available equipment.

In a related field, the economical separation of different constituent particles in aerosol mixtures according to mass has also not been fully realized. The resolution of many environmental and health problems depends upon the separation and quantitative size analysis of aerosols. An apparatus capable of reliably discriminating between various size particle species and measuring their absolute concentrations would find immediate use in such diverse areas as environmental pollution control, research on respiratory illness, and monitoring and control of industrial processes. The need for such apparatus becomes even more acute, for example, as coal assumes a more important role as an energy source.

There is also a need for an effective means of mass analysis for industrially manufactured and naturally occurring polymers, crystallites, microemulsions, and the like, which have dimensions in the submicron range. An important application for a particle separation method or apparatus would therefore include the mass analysis of such material whenever it is possible to disperse them in an aerosol.

Gasdynamic methods for separating two species of disparate mass employ acceleration or deceleration of a flow to produce a differential drift velocity between species. It is this drift velocity which results in spatial separation. The potential for separation at any point is measured by the separation speed ratio, defined as the ratio of drift velocity between the two species of interest divided by their random thermal velocity. Operating conditions which increase this speed ratio increase the separation effect, but they also tend to increase the energy requirements of the device.

Full utilization of the separation potential inherent in a given separation speed ratio requires that the region where spatial separation of the particle species occurs be collision free. Most gasdynamic separation methods are Type I systems in which spatial separation or segregation occurs in a collision-dominated region. The separation factors obtained in such devices are quite low. A few Type II systems have been proposed which exhibit collisionless or free molecular flow in the separation region and as a result are characterized by larger separation factors. All present Type II systems, however, require the maintenance of very low background gas pressures to insure free molecular operation. Such devices have high energy requirements.

It is therefore a principal object of this invention to provide a simple means of achieving high levels of separation of particle species of disparate mass for aerosol analysis, isotope separation and enrichment, and other uses. It is also an important object that the inventive system require relatively low energy consumption per unit of separation work and be capable of simple, inexpensive, and convenient implementation. A further object of the invention is that the separation region be characterized by collisionless or free molecular flow at relatively high operating pressures.

SUMMARY OF THE INVENTION

Consistent with these purposes, the gasdynamic separation system of the invention employs the deceleration of a seeded supersonic free jet through a background gas at controlled pressure to produce a velocity drift or disequilibrium among the particle species to be separated. Separation is achieved by placing a separation membrane, such as a porous wall or capillary array, across the flow at a location where the velocity disequilibrium is largest. The greater residual velocity a species has, the greater is its flux through the membrane. Due to the simple geometry of the flow and the convenient use of a membrane for separation, the device can be scaled down in size and its operating pressures proportionately increased.

This system has several advantages over previous gasdynamic separation methods. The symmetrical deceleration of a seeded supersonic free jet flow gives rise to large separation speed ratios. Because it is operated with collisionless or free molecular flow in the separation region, large separation factors are achieved. Furthermore, since the spatial separation or segregation between particle species occurs within a porous membrane and the size of individual channels or pores can be made very small, the operating pressure of the device can be high before the flow in the separation region becomes collision dominated. A high operating pressure is an advantage as throughput is increased and energy costs for pumping the gas mixture substantially lowered. Also, because all of the free jet flow is directed onto the membrane, large throughputs are obtained.

In accordance with a preferred form of the invention, a carrier gas of light molecular weight is added to the gas or aerosol mixture to be separated. This composite gas mixture is expanded under pressure through a sonic nozzle in order to accelerate the particles to high velocity in a supersonic free jet. Interacting with a light background gas held at a controlled, finite pressure, the carrier gas molecules in the supersonic jet experience a shock wave a short distance downstream of the sonic nozzle. The particles in the gas mixture decelerate in the background gas, and the decelerating flow is directed onto a porous wall or membrane having pores aligned with the flow direction. The membrane separates the constituents of the composite mixture depending upon their residual directed velocities. Separate outputs are withdrawn from each side of the membrane, one enriched in the higher particle mass species having higher residual directed velocities, which preferentially pass through the membrane, and the other enriched in the lower particle mass species having lower or minimum residual velocities, which are preferentially blocked by the membrane. In the expansion of the supersonic free jet from the nozzle, minimum or zero velocity slip between particle species and carrier is desirable. The membrane is located generally where the velocity separation between species is largest, which corresponds optimally with the stagnation distance of the lower particle mass species.

Other features of the invention include the use of cryogenic collecting surfaces to condense the separated particle species. Supplementary streams of a carrier gas on either or both sides of the membrane may also be employed to remove the separated particle species from the system. In certain applications the invention may include the use of a cryogenically cooled membrane to adsorb or condense the particles. To particular advantage in aerosol analysis, the invention may also employ a plurality of membranes in series for separating intermediate particle mass species. Separation units as described above may also be cascaded or the output of a unit may be recycled in order to achieve further enrichment of a separated product.

The above features and further aspects and advantages of the invention are described in detail below in conjunction with the drawings, of which:

FIG. 1 illustrates the principal arrangement of a particle separator according to the invention;

FIG. 2 shows schematically an alternative arrangement for the particle separator of the invention having supplementary streams of a carrier gas on both sides of the membrane to remove the separated particle species;

FIG. 3 is a schematic representation of a separation apparatus of the invention having cryogenic collecting surfaces;

FIG. 4 is a schematic representation of a separation apparatus of the invention using a cryogenically cooled membrane; and FIG. 5 is a schematic representation of a separation apparatus of the invention using a pair of membranes.

DETAILED DESCRIPTION

The novel concept of the invention is to create a velocity disequilibrium between two or more different particle mass species and to use a membrane to preferentially pass a high flux of the species having higher mean velocities and block a high flux of the species having lower mean velocities. This unique combination of effects represents a fundamental advantage over prior gasdynamic separation systems in that it provides a simple method capable of achieving high separation factors with low capital costs and energy requirements. Use of the membrane as a velocity selector permits the reduction in scale of the free molecular sampling or separation region and, consequently, allows operating pressures to be higher and energy consumption lower. Adjusting the membrane characteristics for efficient separation in different applications is also technologically simple.

A fundamental advantage of the invention is also realized in the employment of the free jet deceleration process to achieve the requisite velocity disequilibrium between the disparate particle mass species to be separated. In this process, for example, two heavy particle mass species are expanded along with a light carrier gas through a sonic orifice or nozzle into a light background gas at a controlled pressure. If the expansion pressure ratio is high and there are sufficient collisions in the flow through the nozzle to transfer momentum to the heavy particle species, they achieve an initial velocity after leaving the nozzle that is close to that of the carrier gas molecules. Under optimum conditions, the mean initial velocities achieved by the heavy particle species are nearly equal, so that velocity slip between species in the expansion is minimized. Under these conditions the initial particle velocities are very large, approaching the limiting adiabatic velocity of the carrier gas molecules.

After being accelerated through the nozzle to supersonic initial velocities, the particle species along with the carrier gas molecules expand unrestrictedly into the background gas in a free jet flow characterized by a minimum of inter-particle collisions. A short distance downstream of the sonic nozzle the carrier gas molecules in the jet are decelerated to stagnation equilibrium after encountering a normal shock wave or Mach disk. The shock wave or Mach disk is produced by the interaction of the supersonic jet with the background gas, as will be recognized by persons acquainted with this field. The heavy particle mass species decelerate more slowly than the light carrier gas, and the heavier of the two species exhibits a greater velocity persistence than does the lighter species. If the mass ratio between the heavy particle species and the carrier gas is large, the deceleration process can be controlled to result in a large difference between the velocity distributions of the particle species. Placement of the membrane at a location where the lighter of the two particle species has decelerated to stagnation equilibrium will lead to optimum physical separation of the two species across the membrane. In contrast to the separation of different species under conditions of thermal equilibrium in the gaseous diffusion process, which also makes use of a membrane to segregate two particle species, a much greater separation effect is obtained in the separation system of the present invention by the process of inducing velocity disequilibrium between particle species through deceleration of a supersonic free jet.

The essential characteristics of the gasdynamic separation process of the invention, employing free jet deceleration to create velocity disequilibrium, will now be described in more detail. In the typical case, the two or more particle species to be separated are present in trace amounts, and a low molecular weight gas is the major constituent of both the carrier and the background gas. The mass ratio of the heavy particle species to the carrier gas is large. To emphasize this mass difference, the carrier and the background gas are herein referred to simply as "the gas", and all heavy particle species to be separated will be termed "particles". For convenience, this discussion deals with separation of a binary mixture of particles.

The function of the light carrier gas is twofold: (1) to lower the density and thus collision frequency of the heavy particle species and yet permit operation at a high absolute pressure; and (2) to accelerate the heavy particles to high initial velocities. Once the heavy species are separated across the membrane, the subsequent separation of heavy species from carrier gas can be carried out simply by condensation or adsorption or other means. For example, cryogenic collecting surfaces, discussed later, can be operated so as to trap all impinging heavy particles and none of the carrier gas molecules. The same light gas, such as hydrogen or helium, may be used as the carrier and the background gas. A light carrier gas is naturally present in an aerosol. It must usually be added to gas isotope mixtures.

Initially, the flow of the carrier gas and particle species through the nozzle is isentropic, that is, the particles exhibit the same density, temperature, and velocity variation as the gas. Typically, in the expansion of a seeded free jet, a velocity slip between particles and carrier occurs. It has been found that, when the product of the gas density in the nozzle and the diameter of the nozzle is large, the velocity slip is small and the particles achieve a mean initial velocity approximating the adiabatic limiting velocity of the gas. The greater the initial particle velocities achieved prior to deceleration, the greater is the separation effect achieved by the free jet deceleration process. Thus, minimum or no velocity slip conditions are desirable. These conditions are obtained by maintaining a high product of gas mixture pressure and nozzle orifice diameter.

The next effect experienced by the free jet is a normal shock or Mach disk due to the background gas. Passing through the Mach disk, first the carrier gas and then the particles decelerate to stagnation equilibrium. The average distance required to decelerate a heavy particle will typically be many times the distance required to stagnate the carrier gas. Thus, the gas reaches stagnation quickly and the particle species continue decelerating through the stagnant gas.

Since the higher particle mass species takes a longer distance to decelerate to stagnation equilibrium, the separation between the mean residual velocities of the particle species increases over the deceleration path. Although many different factors will determine the operating conditions of a particular separation device in a specific application, the separation efficiency of the device is related in theory to the initial value of the dimensionless ratio:

$$S_o = (M_p U_{po}^2 / 2kT_g)^{\frac{1}{2}}$$

where
 $m_p$ = mass of heavy particles
 $u_p$ = mean velocity of heavy particles (after acceleration through the nozzle)
 $k$ = Boltzmann constant
 $T_g$ = temperature of background gas A very efficient way of producing a large initial value of $u_p$ is by the expansion of the particles in a light carrier gas under approximately or ideally no velocity slip conditions. In theory such an expansion when carried out to its thermodynamic limit produces:

$$u_p = (2C_g T_o/m_g)^{\frac{1}{2}}$$

where
 $C_g$ = specific heat of the carrier gas
 $T_o$ = initial temperature of the carrier gas in the nozzle
 $m_g$ = mass of the carrier gas molecules.

Thus, $S_o$ becomes:

$$S_o = (C_g M_p T_o / k m_g T_g)^{\frac{1}{2}}$$

The greater this number is, the more effective separation can be expected. Thus, $m_p/m_g$ and $T_o/T_g$, i.e., the respective ratios of particle mass to carrier mass, and of carrier temperature to background temperature, should be large.

An advantage of employing a supersonic free jet flow is that the deceleration of the heavy particles can take place symmetrically. Either a nozzle with a circular orifice producing a free jet with point source symmetry or a nozzle with a slit orifice producing a free jet with line source symmetry can be used. It is found that each particle species loses its directed velocity almost linearly with distance into the stagnant gas. The heavier of the particles species exhibits a slower deceleration and therefore penetrates farther before losing all its initial directed velocity. The particles travel by diffusion after their initial directed velocity has been dissipated. The ratio at any point of directed velocity to diffusion velocity can be expressed approximately as:

$$SR = (M_p U_p^2 / 2kT_p)^{\frac{1}{2}}$$

where
 $u_p$ = local mean velocity of particles
 $T_p$ = local translational temperature of particles As the deceleration process proceeds, the SR value characterizing the heavier of the two species becomes larger than the SR value characterizing the lighter species.

Optimal separation is achieved by placing the membrane at a distance from the nozzle corresponding to the mean stagnation distance of the more rapidly decelerated particle species. In the case of isotopes, this is the deceleration distance of the lighter isotope. In the case of aerosol particles, this is the deceleration distance of the particle with the smaller "aerodynamic" diameter. With low residual velocities or at stagnation, the decelerated particle species exhibits random thermal motion, resulting in low net transmission through the membrane. Location of the membrane at the optimum point can be fine-tuned by adjusting the pressure of the background gas, since mean stagnation distance is inversely proportional to background density.

In the preferred practice of the invention, the membrane is a porous wall which has substantial open area. For example, the membrane may be constructed as an array of capillary tubes closely packed together or as an open-mesh honeycomb structure with the tubes or channels thereof aligned with the direction of jet flow. The net transmission of each particle species through the membrane is related to the ratio SR. For a fixed pore geometry net transmission increases as SR increases. For a fixed SR net transmission is increased if the length to diameter ratio of the pore is decreased. If the latter is too small, however, the separation efficiency is severely decreased since essentially all of the particles can pass through the membrane. Free molecular transmission through the membrane also requires that the length of the capillary tubes or the thickness of the honeycomb structure be small compared to the diffusive mean free path of the particle. This condition is easily satisfied even at relatively high background densities. As an example, a capillary membrane which was used for isotope separation consisted of a 1.5 cm diameter cylindrical bundle of 0.5 mm internal diameter glass capillary tubing embedded in epoxy, from which a 2 mm thin section was cut to produce a membrane having pores of a length to diameter ratio of 4. However, the optimum membrane geometry must be determined for each application.

The total throughput of the separation device is determined by its operating pressures and the diameter of the nozzle orifice. The particle density distribution in the flow generally corresponds to that of an undisturbed free jet. Because the decelerated free jet flow is symmetric, the entire flow can be directed onto the membrane and thereby processed without adversely affecting the separation efficiency of the device.

In FIG. 1, the principal components of a binary separation unit according to the invention are shown. In the chamber 20, a sonic nozzle 1 is aligned with a membrane 2 arranged such that the open passages of the membrane are aligned with the flow at all angular positions of the flow. The nozzle may have any appropriate shape opening, such as a round orifice or a slit. The deceleration region 3 contains the light background gas controlled at a finite pressure by control valve 4. A Mach disk or shock wave is indicated at position 5 typically occurring at a distance of about ten times the diameter of the orifice.

When the membrane 2, such as a capillary array or honeycomb structure, is optimally located at the point corresponding to the stagnation distance of the lighter species, the heavier species is less likely than is the lighter species to collide with the membrane and either condense thereon in the case of an adsorbing membrane or rebound with a random direction in the case of a non-adsorbing membrane. Thus, a higher fraction of the heavier species passes through the membrane 2 into the output region 6 and the desired separation effect is achieved. An outlet 7 is provided for withdrawing a stream enriched with the heavier particle species passing through the membrane 2. Another output 8 is provided for withdrawing a stream enriched with the lighter particle species blocked by the membrane. Output 8 also exhausts the carrier gas of the composite feed gas. Alternatively, as shown in FIG. 2, a set of secondary streams 9 and 10 of light gas is established to sweep the regions immediately on each side of the membrane. Stream 9 becomes enriched with the lighter particle mass species and stream 10 with the heavier species. These streams are pumped out of the separation unit and separated into particle species and carrier fractions in separate units.

In general, aerosol particles will either pass through the membrane without suffering a wall collision or will strike a wall and be adsorbed. Gaseous species, such as isotopes, are deflected and generally not trapped by the membrane. Thus, it is desirable to provide a means of withdrawing gaseous molecules from the vicinity of the membrane in order to prevent their diffusing back to the membrane and eventually passing through. In FIG. 3, cryogenic collecting surfaces 11 cooled by an external refrigeration source 33 are provided to condense the particle species deflected by the membrane 32. Surfaces 12 likewise condense particles which are transmitted through the membrane. The cryogenic surfaces should present negligible surface area in the path of the expanded free jet centered at the nozzle. These collecting surfaces also provide an excellent way of increasing the ratio between the nozzle temperature and the background temperature and thereby yield the additional advantage of greater separation efficiency.

For uninterrupted operation of the separation unit, the cryogenic surfaces must rotate or translate so that fresh area is available to trap the transmitted and deflected species. An alternative mode of operation involves intermittent operation with the cryogenic surfaces. In this mode, the unit is operated until a substantial particle frost is deposited on the surfaces. The carrier gas is continuously pumped out through the outlet 8 from the deceleration region during this time. With the accumulation of frost, the nozzle flow is stopped and the membrane is sealed off by means of a movable barrier isolating deceleration from output region. The cryogenic surfaces are then heated and enriched streams are separately withdrawn from each region.

Operation in the case of aerosol separation is slightly different than in the case with gaseous mixtures. Room temperature surfaces act to adsorb aerosol particles, and these particles cannot be easily recovered once adsorbed. The membrane should therefore be constructed with large diameter openings so that it will not become immediately clogged with adsorbed particles.

In certain cases involving separation of gaseous mixtures, it may prove useful to operate with an adsorbing membrane. In FIG. 4, a separation chamber is shown having a cryogenically cooled membrane 42. An external refrigeration source 43 cools the membrane so that molecules which collide with the membrane surfaces are adsorbed thereon. The adsorbed frost can be vaporized periodically by heating the membrane, and the adsorbed molecules thereby recovered. As in the case with aerosol particles, the membrane should be constructed with large diameter openings so that it will not become immediately clogged by adsorbed molecules.

The separation apparatus of the invention may be constructed to extract an intermediate particle mass species from an aerosol or gas mixture composed of more than two particle species by arranging two membranes in series, as shown in FIG. 5, or by using two binary separation cells such as shown in FIG. 1 in series. Particularly useful in aerosol size analysis, a separation cell having a plurality of membranes as illustrated in FIG. 5 permits an intermediate cut from the region interposed between membranes to be withdrawn 59. 51 is a sonic nozzle similar to 1 and 54 is a control valve for controlling the pressure of the background gas. Light species are preferentially blocked by a first membrane 52. Intermediate mass species are preferentially blocked by the second membrane 53, and heavy species passes through both membranes and are withdrawn through outlet 57. In this manner, a light cut 58, one or more intermediate cuts 59, and a heavy cut 57 can be obtained from a single cell.

As an example of the operation of the invention, the results obtained by applying the method and apparatus described herein to separate $Kr^{86}$ from $Kr^{82}$ as well as $Xe^{132}$ from $Xe^{129}$ are described in the article by Nguyen Ke Thuan and Ronald P. Andres entitled "Free Jet Deceleration—A Scheme for Separating Gas Species of Disparate Mass", published in *Rarefied Gas Dynamics:* Papers Selected from the Eleventh International Symposium on Rarefied Gas Dynamics in Cannes, France, July 1978, Vol. 1, Commissariat A L'Energie Atomique, Paris, France, 1979, pages 667–682. This paper is included by reference as an appendix to this application. As explained therein, carrier and background helium gas temperatures used were about 293° K., and the pressure of the deceleration region maintained at between $10^{-5}$ and $3 \times 10^{-2}$ Torr. Although the device was not optimal in design, separation factors of 1.18 with krypton isotopes and 1.17 with xenon isotopes were measured. By comparison, optimum separation factors for these isotope pairs using the gaseous diffusion process are 1.024 and 1.012, respectively. Thus the system of the invention is capable of producing separation effects at least an order of magnitude greater than conventional diffusion processes. With the temperature of the background gas maintained very much below that initially of the carrier gas, even greater separation factors can be achieved.

In summary, the invention employs the separation effect across a membrane caused by velocity disequilibrium induced in disparate particle mass species in a flow of a gaseous or aerosol mixture. A preferred process for inducing velocity disequilibrium is by decelerating a supersonic free jet of the mixture in a light carrier gas through a light background gas at a controlled, finite pressure. Efficient separation is achieved across a membrane optimally located at a position corresponding to the mean deceleration distance of the more rapidly decelerated particle. The separation effect can be increased by lowering the molecular weight of the carrier relative to the particle species or by decreasing the temperature of the background relative to the temperature of the initial mixture. The use of cryogenic surfaces in the deceleration region and downstream of the membrane provide a convenient way to collect particle species in both regions and to cool the background gas.

The simplicity of the separation unit's geometry permits scaling down of its dimensions. Thus, the device can be operated at relatively high pressures, for example, up to about 1 Torr in the deceleration region for gaseous species and even higher for larger aerosol particles. This in turn means relatively low operating costs and power consumption. It is found that the separation effect of the invention as applied to isotope enrichment is at least an order of magnitude greater than that of conventional gaseous diffusion processes. Further, the invention requires little in the way of development of compatible equipment or new technology. It has great potential application in aerosol size analysis over a wide range of particle sizes and at high throughput levels for significant, absolute concentration measurements. Finally, it can also be used to obtain mass analysis of any species in the submicron size range which can be dispersed as an aerosol.

It will be understood that the foregoing description illustrates the fundamental features of the present invention, and that many variations and modifications of the structural or process features described herein will be readily apparent to one skilled in this field. All such modifications and variations, none of which entail any departure from the spirit and scope of the present invention, are intended to be encompassed within the invention as defined in the appended claims.

What is claimed is:

1. A process for separating a gas or aerosol mixture into its constituents of different mass comprising the steps of: (a) accelerating the mixture in a carrier gas to a high velocity gas flow, (b) differentially decelerating the constituents of the flow through a background gas at a controlled pressure, (c) directing the decelerating flow onto a membrane, (d) withdrawing an output enriched in a high particle mass species which preferentially passes through the membrane, and (e) withdrawing another output enriched in a low particle mass species which is preferentially blocked by the membrane.

2. The process of claim 1 further comprising the step of minimizing velocity slip between particle mass species during acceleration of the mixture.

3. The process of claim 1 further comprising the step of locating the membrane across the flow at a position corresponding to a mean deceleration distance of the low particle mass species.

4. The process of claim 1 wherein step (c) further includes directing the flow onto at least a second membrane downstream of the one membrane, and further comprising the step of withdrawing at least a third output enriched in an intermediate particle mass species which is preferentially passed by the first membrane but blocked by the second membrane.

5. The process of claim 1 wherein step (e) includes condensing the species blocked by the membrane on cryogenic collecting surfaces.

6. The process of claim 1 which comprises the step of raising the temperature of said cryogenic surfaces to recover the adsorbed molecules.

7. A particle separator comprising means for introducing a gas flow containing heavier and lighter species of particles, means for maintaining a background gas in a region of the gas flow for differentially decelerating the particle species, and means including a membrane downstream of said region for separating heavier from lighter particle species.

8. A particle separator comprising means for producing a velocity disequilibrium between heavier and lighter particle species in a gas flow, and means including a membrane across the gas flow for separating heavier from lighter particle species.

9. The particle separator of claims 7 or 8 wherein said membrane passes heavier species and blocks lighter species of particles.

10. A particle separator comprising means for introducing a gas flow containing different particle species, means for maintaining a background gas in a region of the gas flow for differentially decelerating the particle species, and means including a membrane downstream of said region for separating particles having a higher velocity from particles having a lower velocity.

11. A particle separator comprising means for producing velocity disequilibrium between different particle species in a gas flow, and means including a membrane across the gas flow for separating particles of a higher velocity from particles of a lower velocity.

12. The particle separator of claims 10 or 11 wherein said membrane passes particles of higher velocity and blocks particles of lower velocity.

13. The particle separator of claims 8 or 11 wherein said means for producing velocity disequilibrium between particle species includes means for introducing a gas flow of the particle species in a carrier gas, and means for maintaining a background gas in a region of the gas flow for differentially decelerating the different particle species.

14. The particle separator of claims 7, 8, 10 or 11 comprising a plurality of membranes in series.

15. A particle separator comprising a chamber, means for introducing into the chamber a flow of different particle species in a carrier gas, means for maintaining a background gas in a deceleration region of the chamber for differentially decelerating the different particle species in the flow, and a membrane downstream of the deceleration region for passing particles of higher velocity into an output region of the chamber and blocking particles of lower velocity.

16. The particle separator of claim 15 wherein the membrane is positioned at a location corresponding to a mean deceleration distance of a more rapidly decelerated particle species.

17. The particle separator of claim 15 wherein the membrane is a closely packed array of capillary tubes.

18. The particle separator of claim 15 wherein the membrane is an open honeycomb mesh.

19. The particle separator of claim 15 wherein the membrane is adapted to adsorb particles which collide with it.

20. The particle separator of claim 15 further comprising means for withdrawing the blocked particles from the deceleration region of the chamber.

21. The particle separator of claim 20 further comprising a cryogenic collecting surface in the deceleration region of the chamber for collecting the blocked particles.

22. The particle separator of claim 15 further comprising a cryogenic collecting surface in the output region of the chamber for collecting particles passing through the membrane.

23. A particle separator as described in claim 15 comprising a plurality of membranes in series for separating particles of an intermediate size.

24. A particle separator comprising a chamber having an input end and an output end, an orifice at the input end for introducing a gas flow into the chamber, means for forming a gas mixture of heavier and lighter species of particles to be separated and a carrier gas, means for expanding the mixture through the orifice into the chamber in a high velocity flow, means for maintaining a background gas in a deceleration region of the chamber downstream of the orifice for differentially decelerating the heavier and lighter particle species, a membrane at a location downstream of the deceleration region corresponding to a mean deceleration distance of the lighter particle species for passing a substantial flux of the heavier particle species to the output end of the chamber and for blocking a substantial flux of the lighter particle species, and means for withdrawing a first output enriched in particles of the heavier species and a second output enriched in particles of the lighter species.

25. The particle separator of claim 24 adapted to separate at least another particle species of weight intermediate the heavier and lighter species, further comprising at least another membrane downstream of the one membrane at a location corresponding to a mean deceleration distance of the intermediate particle species, and means for withdrawing a third output enriched in particles of the intermediate species.

26. The particle separator of claim 25 wherein said one membrane has cryogenic surfaces for absorbing particles which collide with said one membrane.

27. The particle separator of claim 24 further comprising a cryogenic collecting surface in the deceleration region.

28. The particle separator of claim 27 further comprising an external refrigeration source for cooling said cryogenic collecting surface.

29. The particle separator of claim 24 wherein the membrane has cryogenic surfaces for adsorbing particles which collide with it.

30. The particle separator of claim 29 further comprising an external refrigeration source in communication with said cryogenic surface for cooling said cryogenic surfaces.

31. A particle separator comprising a chamber, means for introducing into the chamber a flow of different particle species in a carrier gas, means for maintaining a background gas in a deceleration region of the chamber for differentially decelerating the different particle species in the flow, a membrane downstream of the deceleration region for passing particles of higher velocity into an output region of the chamber and blocking particles of lower velocity, means for withdrawing the blocked particles from the deceleration region of the chamber, means for maintaining a gas stream flowing parallel to a side of the membrane facing the deceleration region and means for withdrawing an output of the gas stream enriched with blocked particles.

32. A particle separator comprising a chamber, means for introducing into the chamber a flow of different particle species in a carrier gas, means for maintaining a background gas in a deceleration region of the chamber for differentially decelerating the different particle species in the flow, a membrane downstream of the deceleration region for passing particles of higher velocity into an output region of the chamber and blocking particles of lower velocity, means for introducing a gas stream flowing parallel to a side of the membrane facing the output region, and means for withdrawing the gas stream enriched with particles passing through the membrane.

33. A particle separator comprising a chamber having an input and an output end, an orifice at the input end for introducing a gas flow into the chamber, means for forming a mixture of heavier and lighter species of particles to be separated and a carrier gas, means for expanding the mixture through the orifice into the chamber in a high velocity flow, means for maintaining a background gas in a deceleration region of the chamber downstream of the orifice for differentially decelerating the heavier and lighter species, a membrane at a location downstream of the decleration region corresponding to a mean deceleration distance of the lighter particle species for passing a substantial flux of the heavier particle species to the output end of the chamber and for blocking a substantial flux of the lighter particle species, means for withdrawing a first output enriched in particles of the heavier species and a second output enriched in particles of the lighter species, means for maintaining a gas stream flowing parallel to a face of the membrane, and means for withdrawing an output of the gas stream enriched with a separated particle species.

34. A particle separator comprising means for introducing a gas flow containing heavier and lighter species of particles, means for maintaining a background gas in a region of the gas flow for differentially decelerating the particle species, and means including a membrane downstream of said region for separating said heavier from said lighter particle species, said membrane having a cryogenically cooled surface so that the molecules which collide with the membrane surface are adsorbed thereon.

35. The particle separator of claim 34 wherein said cryogenic surfaces are rotatable.

* * * * *